Nov. 22, 1938.  M. TIBBETTS  2,137,733

MOTOR VEHICLE LATCH

Filed Jan. 29, 1937  2 Sheets-Sheet 1

Inventor
*Milton Tibbetts*

By *Tibbetts & Hart*

Attorneys

Nov. 22, 1938.    M. TIBBETTS    2,137,733
MOTOR VEHICLE LATCH
Filed Jan. 29, 1937    2 Sheets-Sheet 2
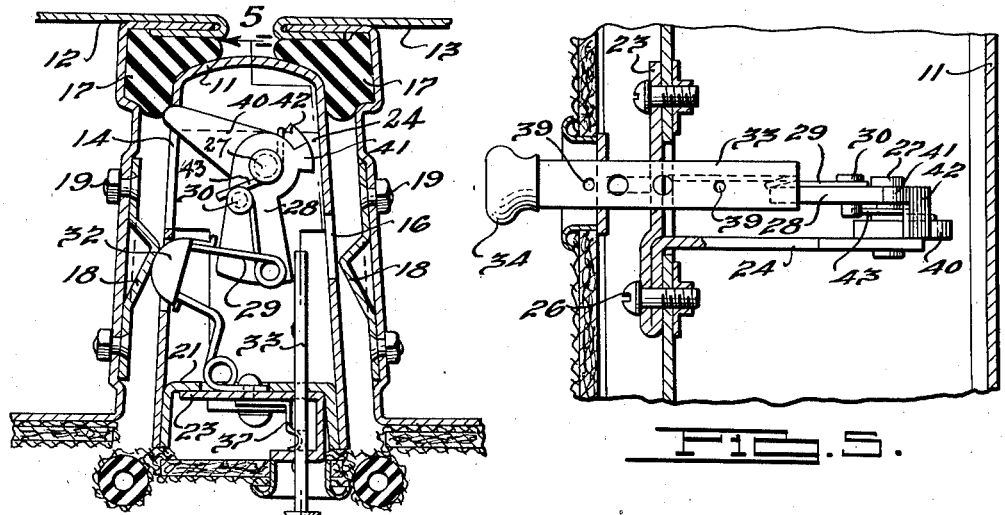
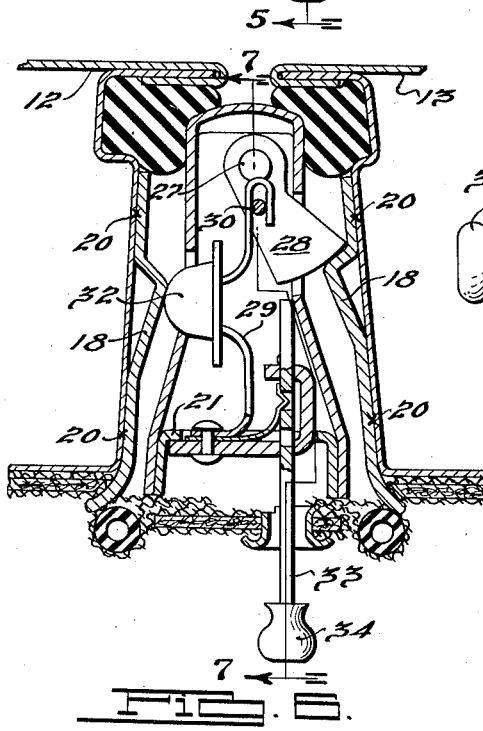
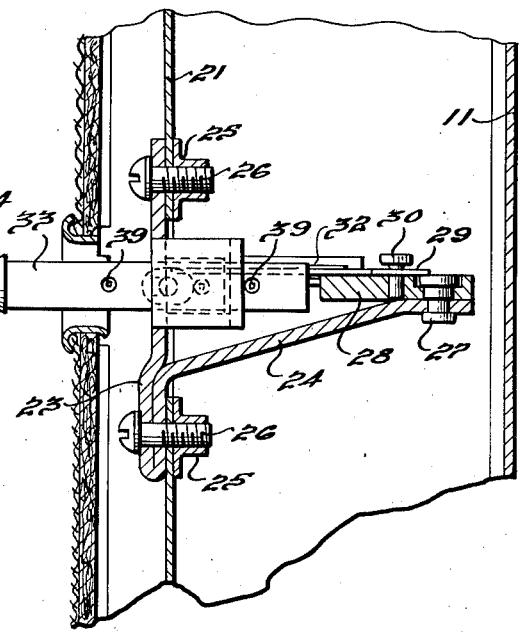
Inventor
Milton Tibbetts
By Tibbetts & Hart
Attorneys Patented Nov. 22, 1938

2,137,733

UNITED STATES PATENT OFFICE 2,137,733

MOTOR VEHICLE LATCH

Milton Tibbetts, Detroit, Mich., assignor to Packard Motor Car Company, Detroit, Mich., a corporation of Michigan Application January 29, 1937, Serial No. 122,901

11 Claims. (Cl. 292—198)

This invention relates to motor vehicles and particularly to the door locking mechanism of such vehicles.

Motor vehicle doors are provided with latch mechanisms that can be operated from the exterior or the interior of the body by handles. Usually some form of locking mechanism, controlled by an occupant of the vehicle body, is also provided to prevent unlatching of the doors from either the exterior or the interior of the body. Such locking mechanism can usually be manually operated from within the bodies, and as a consequence, persons in the rear of the bodies having two doors on a side can open the rear doors without the driver's knowledge. This condition is undesirable as children can manipulate the latching or locking mechanisms too easily and are apt to open a door and fall out of the vehicle body.

It is an object of the invention to provide an improved form of interlocking mechanism between the front and rear doors of a vehicle, so that the rear door cannot be opened when the front door is closed.

Some people prefer that the rear doors should not always be locked by the closing of the front doors and it is one of the objects of the invention therefore that the interlocking mechanism may be made ineffective under certain circumstances.

However, if the means for making the interlock ineffective could be operated when the doors are closed, as when the vehicle is moving, the interlock would be ineffective so far as the safety of children is concerned. It is an object of the invention therefore that this defect be cured and it is done by the provision of means whereby the device for rendering the interlock ineffective is itself inoperative when the front door of the vehicle is closed. Such device is inoperative to render the interlock ineffective, whether the doors are open or closed at the time, but it is prevented from operating to destroy the effectiveness of the interlock when to do so would permit ready opening of the rear door.

In previous interlocking door means it has been found that when the front door is opened the interlock will not always immediately release the rear door, and this is particularly so if an attempt has been made to open the rear door before the front door is opened. Such attempt causes the rear door to become unlatched and then it presses heavily against the interlocking device and the latter is prevented from being retracted by its usual operating spring. It is an object of the present invention that under these circumstances the interlock will be positively withdrawn from locking engagement with the rear door, this being accomplished by a positive connection between the front door and the interlock, so as that door is opened the interlock will be withdrawn and the rear door released from its locked condition.

Other objects of the invention will appear from the following description taken in connection with the drawings, which form a part of this specification, and in which:

Fig. 4 is a view similar to Fig. 2 showing the locking mechanism held in ineffective position;

Fig. 5 is a sectional view taken on line 5—5 of Fig. 4;

Fig. 6 is a view similar to Fig. 2 showing another form of the locking mechanism in locking position;

Fig. 7 is a sectional view taken on line 7—7 of Fig. 6.

Figure 1:
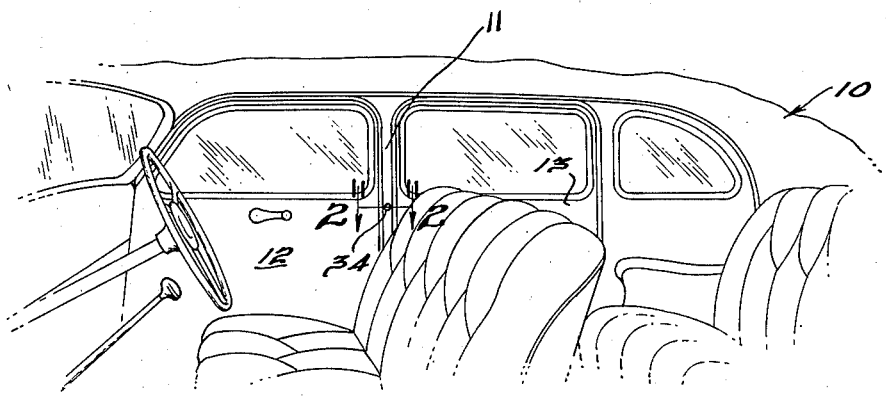
Fig. 1 is a fragmentary interior elevational view of a motor vehicle embodying the invention.

In the drawings 10 indicates a conventional motor vehicle having on both sides a center pillar 11, a front door 12, and a rear door 13. The front door is hinged at its forward end and the rear door is hinged at its rear end, both of the doors being mounted on vertical hinges and swingable relatively to the center pillar in a relation such that they are in alignment with each other and the pillar when in closed position. These doors are each provided with a conventional latch mechanism (not shown) that can be actuated by handles located interiorly and exteriorly of the body.

Preferably supported in the center pillar 11 is the interlocking mechanism of this invention. This mechanism comprises a locking member for the rear door adapted to be moved into locking position by the closing of the front door. The means through which the locking member is moved to locking position is of a yielding character, so that if the front door should be closed before the rear door is closed, the latter may be closed, the locking member yielding as the keeper passes over it. The mechanism also comprises means accessible for operation from the inside of the vehicle only, for retaining the locking member in its unlocked position, thus rendering the interlocking mechanism ineffective. However, this means can only be moved into its locking member retaining position when the locking member itself is in non-locking position, as when the front door is open. Positive means are provided for preventing this device from moving to locking member retaining position when the locking member is in locking position and the device cannot be operated to withdraw the interlock from its locking position.

Figure 2:
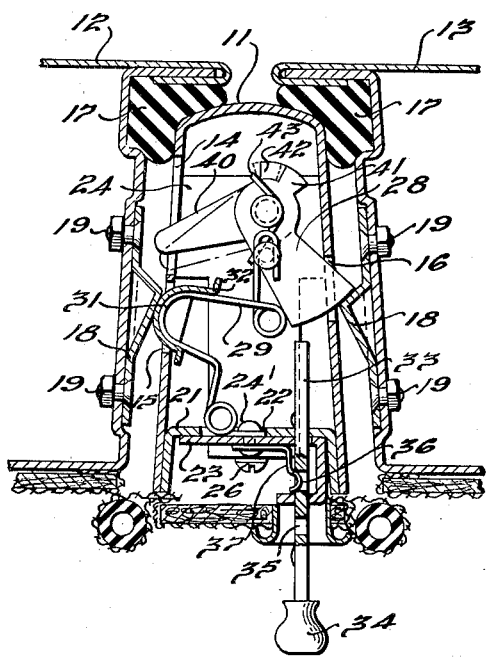
Fig. 2 is a horizontal sectional view taken on line 2—2 of Fig. 1, showing one form of the locking mechanism in door locking position.
Figure 3:
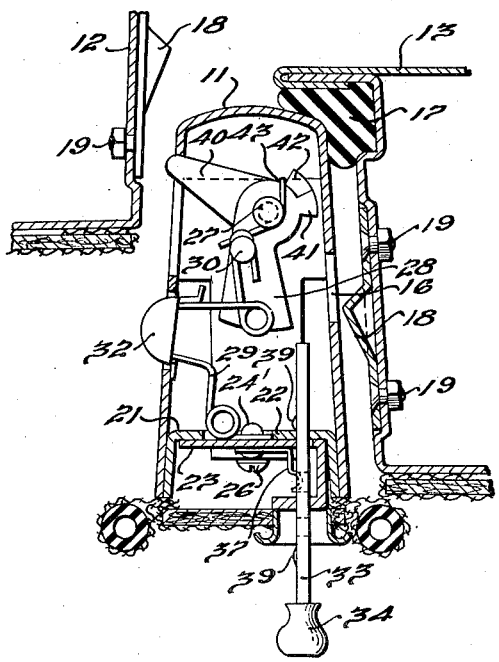
Fig. 3 is a view similar to Fig. 2 except that the locking mechanism is shown in unlocked position.

Referring to the drawings, the locking mechanism is substantially contained entirely within the center pillar and, in the illustrated form of body, this pillar is made of sheet metal having the forward wall formed with a slot 15 and the rear wall formed with a slot 16. The adjacent end walls of the front and rear doors have soft rubber weather stripping 17 fixed to the outer portion thereof for engagement with the center pillar, and these same door walls have abutment plates or keepers 18 fixed thereto by bolts 19, as shown in Figs. 2 to 4, and by welding as at 20 as shown in Fig. 6. The inner wall 21 of the pillar is provided with a slot 22 and fixed over this slot is a carrier 23 having a bracket portion 24 extending through the slot for supporting the locking mechanism. Screw bosses 25 are permanently secured to the inner wall of the pillar and screws 26 pass through this pillar wall and are screwed into the bosses 25 to secure the carrier in position.

The bracket 24 extends in a horizontal direction into the interior of the center pillar and carries a vertically extending pivot member 27 on which a locking member 28 is swingably mounted. This member 28 swings in a horizontal direction and is adapted to be projected through the slot 16 to engage the abutment member 18 on the rear door to prevent such door from being opened. This swinging locking member has a latch effect with the abutment, and it is mounted so that it can be moved inwardly of the pillar to ride on the abutment when closing the rear door if the front door is holding the locking mechanism in locking position.

The swinging locking member is normally maintained concealed within the pillar by actuator means which is also arranged so that it can be engaged by the abutment on the front door to force the locking member into locking relation with the rear door abutment. This actuator means, for the swinging locking member 28, can be in the form of a spring wire member 29 removably anchored at one end on a pin 30 fixed to the locking member and fixed at the other end to the carrier 23 by a rivet 24'. This spring is formed with a loop portion 31 on which is fitted a cap 32 and such capped loop is arranged to project through the slot 15 in the pillar into a position where it will be engaged by the abutment on the front door during the last part of its closing movement and while it is closed.

The spring 29 normally acts to hold the locking member 28 concealed within the pillar and the capped portion of this spring projects through the opening 16 of the pillar so that it will be cammed by the abutment on the front door. This camming action of the front door abutment against the spring cap will be transferred to the pin 30 which will swing the locking member 28 to a position where it projects through the slot 16 sufficiently to engage the abutment on the rear door and prevent opening of the rear door after the front door has once been closed. When the camming action against the spring cap ceases then the spring member 29 will return the locking member into concealed position within the pillar, and the rear door will then be unlocked so that it can be opened and closed in the usual manner. It will thus be seen that the locking mechanism acts automatically to lock the rear door when the front door is closed and such mechanism is released from locking positon when the front door is opened. It will be impossible with this locking mechanism for anyone to open the rear door while the front door is closed.

Associated with the locking mechanism is manually controlled selector means operable only from the interior of the body for dogging or releasing the locking member 28. A stem 33 is slidably mounted in openings in the carrier 23 and has fixed on its inner end a knob 34 by means of which it can be manually pushed in or pulled out. When the stem is pushed into the pillar, with the locking member 28 in non-locked position, it will extend behind the locking member, as shown in Fig. 4, so that the locking member will be positively retained against movement into locking position. When the stem or selector means is pulled outwardly from the pillar, as shown in Fig. 3, then the locking member 28 can clear the same and be actuated to lock the rear door. Stops 39 on the stem are arranged to engage portions of the carrier to limit the inward and outward movement of the selector. In order to hold the stem in either one of these two positions, I provide the same with recesses 35 and 36, for receiving a spring 37 fixed to the carrier. The spring is preferably secured at one end to the carrier by the rivet 24' which also secures the spring 29. The free end of this spring 37 is bent and normally bears against the stem with sufficient force to project into the recesses 35 and 36 in order to retain the stem in either one of two positions. Of course the force exerted by this spring is such that it can be readily overcome when it is desired to change the adjustment of the stem.

The above description refers to the mechanism of all of the figures of the drawings, but the construction shown in Figs. 6 and 7 does not contain the positive retracting mechanism about to be described.

Under some conditions the locking member 28 cannot be retracted by the spring 29 when the front door is opened, this being due to the friction between the outer end of the locking member and the keeper 18. This condition is aggravated if an attempt has been made to open the rear door with the interlock in operation, as in that case the door latch may not return to its latched position and the rubber weather stripping 17 therefore will urge the door outwardly and the keeper 18 will press with greater force against the end of the locking member 28. But in this invention provision is made for positively withdrawing the locking member 28 as the front door is swung open. The means thus provided is illustrated in Figs. 2, 3, 4, and 5. The pivot member in this instance is slightly longer than it is in the form of the invention shown in Figs. 6 and 7 and serves also as a mounting for an actuator member 40 which is arranged to swing in a horizontal direction and projects through slot 14 in the front wall of the center pillar. The locking member 28 in this instance is provided with a lug 41 with which a lug 42 on the actuator member 40 is normally held in engagement by a wire spring 43. This spring encircles the pivot member 27 and one end thereof bears against the lug 42 and the other end bears against the pin 30. This spring normally holds the lugs in engagement.

When the actuator member 40 is associated with the abutment 18 on the front door when opening and closing. When such door is opened this camming action will move the member 40 in a clockwise direction and thereby positively withdraw the locking member 28 from engagement with the abutment member on the rear door through the inter-engaging lugs 41 and 42. When the front door is being closed the abutment member thereon will cam the member 40 causing it to move in a counter-clockwise direction, and it can do this independently of the locking member. The abutment member will move past the actuator member and the latter will be returned by its spring 43 to a position where its lug 42 engages the lug 41 on the locking member, as shown in full lines in Fig. 2. The extreme position to which the member 40 is cammed, under the circumstance just related, is shown in dotted lines in Fig. 2. Closing of the front door also cams the capped spring 29, as previously described, to swing the locking member 28 into locking position with the abutment on the rear door. It will also be noted that if the rear door is open when the front door is closed, closing of the rear door will move the locking member in a clockwise direction sufficiently for it to ride over the abutment on the rear door whereupon it will be returned to locking position by the spring 29, the locking member being free to move in this manner.

The door locking mechanism herein described is automatically operated by the front door as the latter is closed and the locking member is yieldingly retained in locking position. If the rear door has not been closed it may now be moved to closed position and the locking member will first yield and then return to locking position. When the locking member is in its locking position the opening of the front door will positively withdraw the locking member and thus release the rear door. Should it be desired to render the interlock ineffective this may be done by opening the front door so that the locking member will be moved to non-locking position by the spring 29 and the device 33 may be moved in front of the locking member to thereby retain it and prevent its moving to locking position.

With this mechanism, when the vehicle is being driven and both doors are closed, but the interlocking mechanism is held in its ineffective position by the device 33, if it is desired to lock both doors against outside intrusion this may be done by pulling the device 33 outwardly and then locking the front door with the usual inside locking device. But this same device 33, which is accessible on the inside of the vehicle and therefore could be reached by a child in the rear compartment, cannot be used to restore the locking member to its unlocked position without first opening the front door. Therefore the rear door is securely held against outside intrusion and likewise against accidental opening from the inside.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a vehicle body having a pair of hinged doors on one side and a pillar between the doors, a locking device for the rear door comprising a locking member mounted in the pillar, and a spring member mounted in the pillar for normally urging said locking member within the pillar, said spring member projecting from said pillar into the path of front door movement and being arranged to be operated thereby to move said locking member into locking position.

2. In a vehicle body having a pair of hinged doors on one side, locking mechanism for the rear door comprising a locking member mounted to be moved into and out of locking position with the rear door, means actuated by the front door while being closed for moving said member into locking position, and means actuated by the front door while opening for moving said member out of locking position.

3. Locking mechanism for a vehicle body door comprising a carrier fixed to the body, a mounting on the carrier, a locking member swingably mounted on the mounting, and a spring device having a part fixed on the carrier for actuating said locking member.

4. In a vehicle body having on one side thereof a pair of hinged doors and a pillar between the doors, locking mechanism for the rear door comprising a movable locking member mounted in the pillar, means operated by the front door when closing for moving the locking member into locking engagement with the rear door, and means operated by the front door while being opened for positively moving the locking member out of locking engagement with the rear door.

5. In a vehicle body having on one side thereof a pair of longitudinally related hinged doors and a pillar between the doors, locking mechanism for the rear door comprising a mounting in the pillar, a locking member swingable on the mounting, a second member swingable on the mounting and extending into the path of front door movement, interengageable lugs on said members, and means for swinging said locking member mounted in said pillar and extending into the path of the front door movement, said front door engaging said last mentioned means while closing to move said locking member into locking relation with the rear door, said front door actuating said second member while being opened to positively swing said locking member out of locking relation with the rear door.

6. In a vehicle body having on one side thereof a front and rear door and a pillar between the doors, locking mechanism for the rear door comprising a locking member swingably mounted in the pillar, spring means in the pillar attached to the locking member and arranged to urge it into the pillar, said spring means extending into the path of the front door movement and cammed thereby upon closing movement to swing the locking member into locking engagement with the rear door, a second member swingably mounted in the pillar having a portion projecting into the path of the front door movement, inter-engaging lugs on the members in the pillar, and spring means urging the lug on said second member into engagement with the lug on said locking member, opening movement of the front door swinging the second member and positively moving said locking member out of rear door locking position through said lugs, said members being freely swingable in directions opposing the spring force exerted to hold said lugs together.

7. In a motor vehicle body having two doors, locking mechanism comprising a locking member for one door adapted to be moved into locking position by the closing of the other door, means for holding said locking member in retracted position when said other door is open, and means accessible for operation on the inside of the vehicle for movement to prevent said locking member moving from non-locking to locking position, said latter means being so movable only when said locking member is in its non-locking position.

8. In a motor vehicle body having a door, locking mechanism comprising a locking member for said door, yielding means through which said locking member may be moved to locking position and yieldingly held there, and a device operable only from the inside of the vehicle for retaining said locking member in non-locking position against the action of said yielding means, said device being movable to release said locking member so that it may thereby move to locking position, the arrangement being such that the movement of said device to locking member retaining position is prevented when said locking member is in locking position.

9. In a motor vehicle body having two doors, locking mechanism comprising a locking member for one of said doors, means for moving said locking member from non-locking to locking position and yieldingly retaining it there, by the closing of the other door, and means whereby said other door in its opening movement positively retracts said locking member from its locking to its non-locking position.

10. In a motor vehicle body having two doors, locking mechanism comprising a locking member for one of said doors, means for moving said locking member from non-locking to locking position and yieldingly retaining it there, by the closing of the other door, and means whereby said other door in its opening movement removes the yielding retaining action from said locking member and at the same time positively retracts said locking member from its locking to its non-locking position.

11. A locking device for a door comprising a locking member, a spring member operable to move said locking member into and out of door locking position, and means acting through and including said spring member to move the locking member from one position to another and return it.

MILTON TIBBETTS.